United States Patent [19]

Tanaka et al.

[11] Patent Number: 4,756,461
[45] Date of Patent: Jul. 12, 1988

[54] CAPSTAN BEARING DEVICE

[75] Inventors: Shinsaku Tanaka, Tokyo; Kunio Kido, Wako, both of Japan

[73] Assignee: Tanashin Denki Co., Ltd., Tokyo, Japan

[21] Appl. No.: 925,548

[22] Filed: Oct. 31, 1986

[51] Int. Cl.$^4$ ............... B65H 20/02; B65H 23/04
[52] U.S. Cl. ........................... 226/194; 226/196
[58] Field of Search ............ 226/194, 190, 189, 196

[56] References Cited

U.S. PATENT DOCUMENTS 3,462,057  8/1969  Yamamoto ............... 226/194 X
3,921,881  11/1975  Dattilo ..................... 226/194
3,967,769  7/1976  Matsumoto ............... 226/194

FOREIGN PATENT DOCUMENTS 1486228  9/1977  United Kingdom .

Primary Examiner—Stuart S. Levy
Assistant Examiner—Lynn M. Sohacki
Attorney, Agent, or Firm—Wegner & Bretschneider

[57] ABSTRACT

A capstan bearing device comprises a cylindrical bearing main body extending through and fixed to a base plate and supporting at both end portions thereof a capstan, which is equipped at one end thereof with a flywheel, rotatably thereon; a cylindrical enclosure for the capstan, said enclosure defining an opening through a part of the peripheral wall thereof so as to receive an associated pinch roller through the opening, connected to one end of the bearing main body, enclosing the capstan therein and being adapted to be inserted in a capstan insertion hole of a tape casette; and means provided in adjacent to the free end of the capstan enclosure for the prevention of slip-off of the capstan.

5 Claims, 3 Drawing Sheets

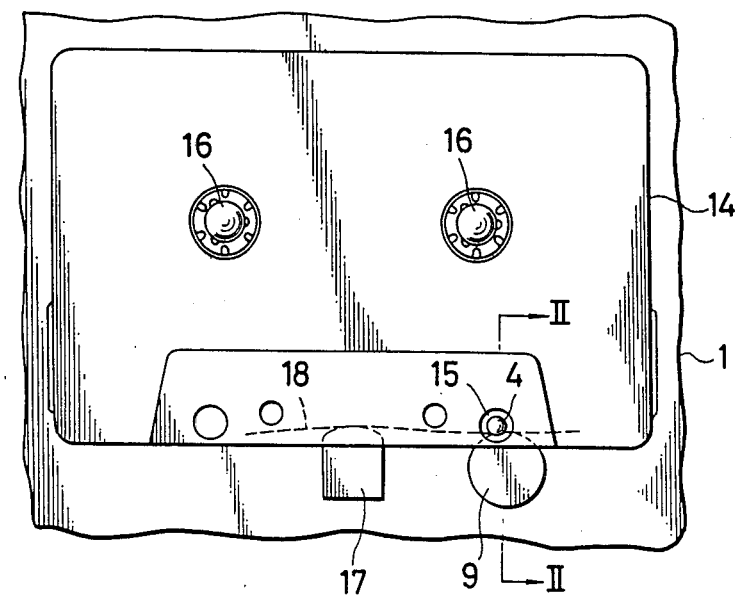
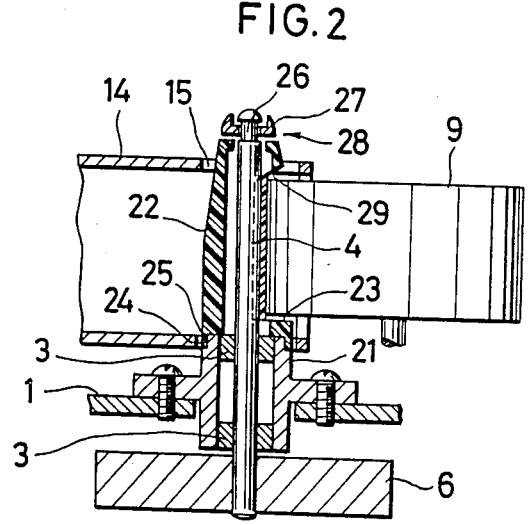

CAPSTAN BEARING DEVICE

BACKGROUND OF THE INVENTION (1) Field of the Invention

This invention relates to a capstan bearing device for a cassette tape recorder.

(2) Description of the Prior Art:

Capstan bearing devices for cassette tape recorders had such a structure as shown in FIG. 5. Namely, FIG. 5 is a vertical cross-section of a typical conventional capstan bearing device. A cylindrical bearing main body 2 is fixed on a base plate 1 by means of screws or the like. The bearing main body 2 in turn supports the lower half portion of a capstan 4 by way of bearing metals 3. The capstan 4 is also supported at the lower end thereof by a support 5 mounted on the rear side of the base plate 1, whereby the capstan 4 is prevented from slipping off the bearing main body 2.

A flywheel 6 is provided on the capstan 4 at a position below the bearing main body 2. Moreover, such a capstan bearing device is required to pass successfully through a severe impact or shock test which is performed in the final stage of the manufacturing process. In the structure depicted in FIG. 5, it was hence essential to use a durable member as the support 5 which supports the lower extremity of the capstan 4. This requirement hence led to a problem of high manufacturing cost. In addition, the above structure required an irksome operation for mounting the support 5.

With a view toward overcoming the above-described problem, it has been proposed to employ such a structure as shown in FIG. 6 instead of supporting the capstan 4 at the lower extremity thereof. In FIG. 6, an annular groove 7 is formed in the capstan 4 at an axially central part thereof. The annular groove 7 is positioned right above the upper end of the bearing main body 2 and a stopper washer 8 is fit in the annular groove 7 so as to prevent the capstan 4 from slipping off the bearing main body 2 downwardly.

In the above structure, the capstan 4 receives pressing forces from an associated pinch roller 9 at a position above the annular groove 7. As a result, stress is concentrated on the annular groove defining part of the capstan 4, where the capstan 4 is rendered thinner locally. The above structure is hence accompanied by a problem that the strength of the capstan 4 is reduced to a significant extent.

With the foregoing in view, it has been contemplated to employ such as structure as illustrated in FIG. 7. Namely, a bearing main body 11 has a greater length. An opening 12 is formed through a part of the peripheral wall thereof so as to receive the associated pinch roller 9 therethrough. The capstan 4 is rotatably supported at both ends of the bearing main body 11 by way of bearing metals 3 respectively. Further, an annular groove 13 is formed in an upper end portion of the capstan 4, in which a washer 8 is fit so as to prevent the capstan 4 from slipping off the bearing main body 11 downwardly. In application, the bearing main body 11 is inserted in a capstan insertion hole 15 of a tape cassette 14.

However, the provision of the opening 12 through the peripheral wall of the bearing main body 11 causes the bearing main body 11 to undergo bending deformation and as a result, the axes of the bearing metals 3 provided at both ends of the main bearing body 11 are rendered out of registration. The axes of the bearing metals 3 can be brought into coincidence if both inner end peripheral walls of the bearing main body 11 are machined for their centering after fabrication of the bearing main body 11 through a die or the like. Due to the formation of the opening 12 through the part of the peripheral wall, the bearing main body 11 undergoes gradual bending deformation in the course of its use over a long period of time so that the axes of both bearing metals 3 are rendered out of registration, leading to a problem that the smooth rotation of the capstan 4 is impaired.

SUMMARY OF THE INVENTION

With the foregoing in view, the present invention has as its principal object the provision of a capstan bearing device which does not require any solid support, can avoid concentration of stress on a specific intermediary part of a capstan and permits smooth rotation of the capstan over a long period of time.

In one aspect of this invention, there is thus provided a capstan bearing device comprising:

a cylindrical bearing main body extending through and fixed to a base plate and supporting at both end portions thereof a capstan, which is equipped at one end thereof with a flywheel, rotatably thereon;

a cylindrical enclosure for the capstan, said enclosure defining an opening through a part of the peripheral wall thereof so as to receive an associated pinch roller through the opening, connected to one end of the bearing main body, enclosing the capstan therein and being adapted to be inserted in a capstan insertion hole of a tape casette; and means provided in adjacent to the free end of the capstan enclosure for the prevention of slip-off of the capstan.

Owing to the above-described structure, the capstan bearing device of this invention does not require neither solid support, which is otherwise required to support the capstan at its lower extremity, nor an annular groove at an intermediary part of the capstan. The omission of such an annular groove can avoid localized concentration of stress on the capstan. The capstan can therefore be supported rotatably while being assured to undergo smooth rotation over a prolonged period of time.

BRIEF DESCRIPTION OF THE DRAWINGS

The above and other objects, features and advantages of the present invention will become apparent from the following description and the appended claims, taken in conjunction with the accompanying drawings, in which:

FIG. 1 is a fragmentary top plan view of a tape recorder, in which the present invention has been incorporated;

FIG. 2 is a vertical cross-section of a capstan bearing device according to a first embodiment of this invention, taken along line II—II in FIG. 1;

DETAILED DESCRIPTION OF THE INVENTION AND PREFERRED EMBODIMENTS

Figure 3:
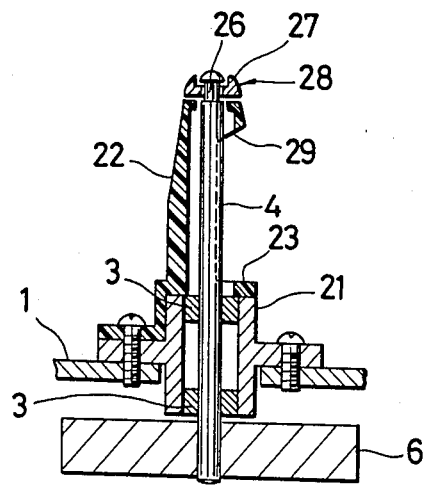
FIG. 3 is a vertical cross-section similar to FIG. 1 but shows a capstan bearing device according to a second embodiment of this invention.

Referring first to FIG. 1 and FIG. 2, the first embodiment of this invention will be described. On a base plate 1 of the tape recorder, a capstan 4 and a pair of reel shafts 16 are provided as depicted in FIG. 1. A tape cassette 14 is mounted on the paired reel shafts 16. Further, a magnetic head 17 and pinch roller 9 are also provided on the base plate 1 in such a way that the magnetic head 17 and pinch roller 9 can be selectively caused to advance or retreat. The magnetic head 17 and pinch roller 9 are allowed to enter the tape cassette 14 through their corresponding openings formed through the front wall of the tape cassette 14. The pinch roller 9 and capstan 4 then hold a magnetic tape 18, which is disposed within the cassette 14, therebetween. Upon rotation of the capstan 4, the magnetic tape 18 is fed at a constant speed in a desired direction. At the same time, the take-up reel shaft is rotated so as to rewind the magnetic tape 18 on the tape-up reel.

The capstan 4 is rotatably supported on the base plate 1 by way of a capstan bearing device, which is constructed as shown in FIG. 2.

A cylindrical bearing main body 21 extends through the base plate 1 and is fixedly secured on the base plate 1 by means of screws. The bearing metals 3 made of an oilless metal or the like are fit in both upper and lower end portions of the bearing main body 21 respectively. The capstan 4 equipped with the flywheel 6 at the lower extremity thereof is rotatably supported by both bearing metals 3. Connected to the upper end of the bearing main body 21 is a cylindrical capstan enclosure 22 which is made of a synthetic resin and is tapered toward the free end thereof, namely, upwardly as viewed in FIG. 2 to facilitate the loading of a tape cassette. The capstan enclosure 22 defines through a part of its peripheral wall an opening 23 so as to receive the pinch roller 9 through the opening 23. The capstan enclosure 22 thus surrounds the upper half of the capstan 4. The capstan enclosure 22 also has two antipodal interlocking projections 24 on the lower edge thereof. The interlocking projections 24 are maintained in engagement with interlocking recesses 25 formed in the upper edge of the bearing main body 21, whereby the capstan enclosure 22 is prevented from rotation.

On the other hand, an annular groove 26 is formed in an upper end portion of the capstan 4 at the same height as the upper extremity of the capstan enclosure 22. A stopper washer 27 is fit in the annular groove 26, thereby forming a slip-off preventing structure 28 for the prevention of downward slip-off of the capstan 4. The capstan enclosure 22 is shaped and dimensioned in such a way that it can be inserted into the capstan insertion hole 15 of the tape cassette 14. The upper edge of the opening 23 is formed into an oblique surface 29.

Figure 5:
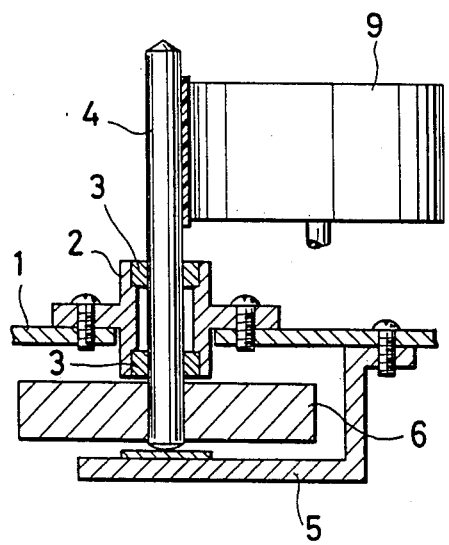
FIG. 5 through FIG. 7 are all vertical cross-sections similar to FIG. 1 but show the above-described conventional capstan bearing devices respectively.
Figure 6:
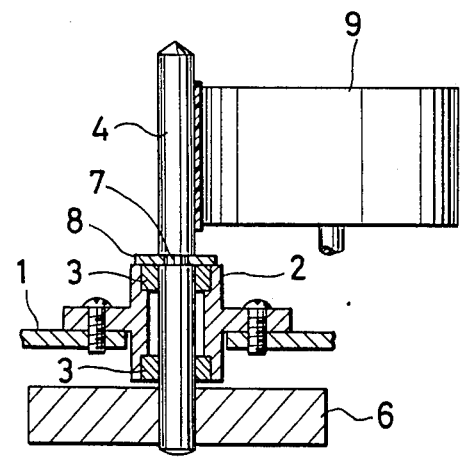
Figure 7:
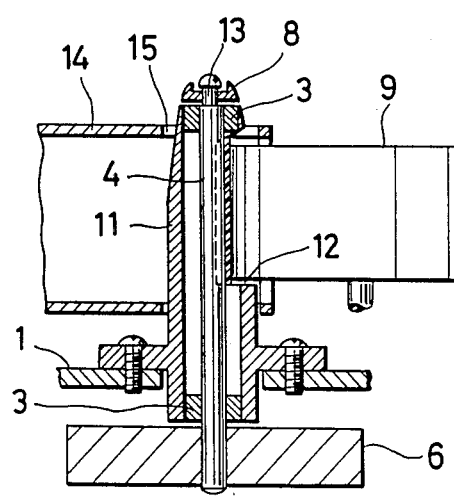

Unlike the conventional example illustrated in FIG. 5, the capstan bearing device of such a structure as described above does not require any solid support which serves to support the capstan 4 at its lower extremity. It is also unnecessary to provide an annular groove at an intermediary part of the capstan 4 unlike the conventional example depicted in FIG. 6, so that localized concentration of stress can be avoided. The capstan bearing device of the first embodiment is also different in structure from the conventional example shown in FIG. 7, which has such a structure that the capstan 4 is rotatably supported at positions immediately above and below the opening permitting the entry of the pinch roller. Accordingly, the axes of both bearing metals are not rendered out of registration even when used over an extended period of time, whereby the capstan is always allowed to undergo smooth rotation while being supported on the bearing metals.

In addition, the lower edge of the opening 23 of the capstan enclosure 22 controls the position of the magnetic tape 18. Hence, the lower edge serves as a tape guide for the prevention of widthwise displacement of the magnetic tape 18. Moreover, the upper edge of the opening 23 is formed into the oblique surface 29. It is therefore possible to guide the magnetic tape 18 easily to a predetermined position on the capstan 4 owing to the provision of the oblique surface 29.

FIG. 3 shows the second embodiment of this invention, in which a part of the capstan envelope 22 is screwed on the base plate 1 by the same screw as the bearing main body 21.

The structure of the second embodiment can obviate the interlocking projections 24 of the capstan envelope 22 and the interlocking recesses 25 of the bearing main body 21 in the first embodiment of this invention.

Figure 4:
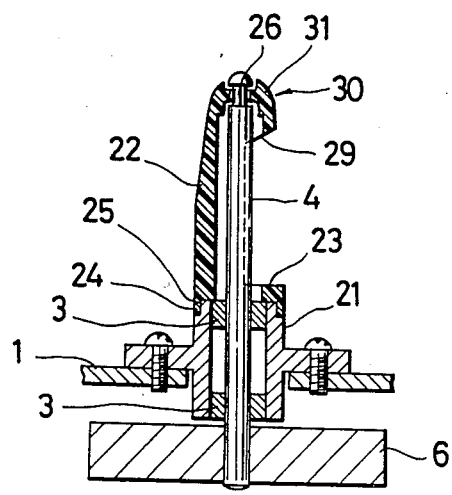
FIG. 4 is a vertical cross-section similar to FIG. 1 but shows a capstan bearing device according to a third embodiment of this invention.

Turning next to FIG. 4, the third embodiment of this invention is illustrated. The third embodiment relates to a modification of the capstan slip-off preventing structure 20. Namely, a fitting part 31 which fits in the annular groove 26 of the capstan 4 is formed integrally at an upper end portion of the capstan envelope 22 in order to avoid the slip-off of the capstan 4.

The structure of the third embodiment can obviate the stopper washer 27 in both of the preceding embodiments. The slip-off of the capstan. 4 can be prevented only by fitting the fitting part 31 in the annular groove 26 of the capstan 4 while making use of the elasticity of the material itself of the fitting part 31. The third embodiment of this invention can therefore facilitate the assembly work.

Having now fully described the invention, it will be apparent to one of ordinary skill in the art that many changes and modifications can be made thereto without departing from the spirit or scope of the invention as set forth herein.

We claim:
1. A capstan bearing device comprising:
a cylindrical bearing main body extending through and fixed to a base plate and supporting at both ends of the bearing main body a capstan, said capstan having at one end thereof a rotatable flywheel;
an at least partially tapered cylindrical enclosure for enclosing said capstan, said enclosure coupled at one end to one end of said cylindrical bearing main body, said enclosure having an opening through a part of the peripheral wall thereof so as to receive an associated pinch roller through said opening, and said enclosure being insertable into a capstan hole of a tape cassette; and
means provided adjacent to the free end of the enclosure for the prevention of slip-off of the capstan.

2. The capstan bearing device as claimed in claim 1, wherein the bearing main body defines at least one projection at said one end thereof and the enclosure defines at least one matching recess at said one end.

3. The capstan bearing device as claimed in claim 1, wherein the slip-off preventing means comprises an annular groove formed in the capstan above the free end of the enclosure and a stopper washer fit in the groove.

4. The capstan bearing device as claimed in claim 1, wherein the enclosure is tapered toward the free end thereof to facilitate the loading of a tape cassette.

5. The capstan bearing device as claimed in claim 1, wherein the bearing main body defines at least one recess at said one end thereof and the enclosure defines at least one matching projection at said one end.

* * * * *